US007511665B2

(12) United States Patent
Wicks et al.

(10) Patent No.: US 7,511,665 B2
(45) Date of Patent: Mar. 31, 2009

(54) METHOD AND APPARATUS FOR A FREQUENCY DIVERSE ARRAY

(75) Inventors: Michael C. Wicks, Utica, NY (US); Paul Antonik, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 43 days.

(21) Appl. No.: 11/974,942

(22) Filed: Oct. 16, 2007

(65) Prior Publication Data

US 2009/0015474 A1 Jan. 15, 2009

Related U.S. Application Data

(62) Division of application No. 11/312,805, filed on Dec. 20, 2005, now Pat. No. 7,319,427.

(51) Int. Cl.
*H01Q 3/00* (2006.01)
*G01S 13/32* (2006.01)
*G01S 13/536* (2006.01)

(52) U.S. Cl. ...................... 342/372; 342/201; 342/25 C

(58) Field of Classification Search .................. 342/372
See application file for complete search history.

(56) References Cited

U.S. PATENT DOCUMENTS 2,449,553 A * 9/1948 Hansel ....................... 342/436
3,042,916 A * 7/1962 Clarke ........................ 342/380
4,613,974 A * 9/1986 Vokac et al. ................ 375/259
5,943,363 A * 8/1999 Hanson et al. .............. 375/150
6,040,759 A * 3/2000 Sanderson .................. 725/130
6,252,693 B1 * 6/2001 Blauvelt ..................... 398/194
6,594,082 B1 * 7/2003 Li et al. ...................... 359/618
2004/0048574 A1 * 3/2004 Walker et al. .............. 455/63.1
2005/0081636 A1 * 4/2005 Barshinger et al. ............ 73/606
2006/0063490 A1 * 3/2006 Bader et al. ................... 455/45
2006/0098761 A1 * 5/2006 Leizerovich et al. ........ 375/303
2006/0152403 A1 * 7/2006 Wicks et al. .............. 342/25 R
2006/0273255 A1 * 12/2006 Volkov et al. ............ 250/336.1
2007/0092025 A1 * 4/2007 Bi et al. ...................... 375/284

* cited by examiner

*Primary Examiner*—Thomas G Black
*Assistant Examiner*—Shelley Chen
(74) *Attorney, Agent, or Firm*—Joseph A. Mancini

(57) ABSTRACT

Method and apparatus for a frequency diverse array. Radio frequency signals are generated by a plurality of independent waveform generators and simultaneously applied to a transmit/receive module. A progressive frequency shift is applied to all radio frequency signals across all spatial channels. Amplitude weighting signals are applied for sidelobe control. Phase control is included for channel compensation and to provide nominal beam steering. The progressive frequency offsets generate a new term which cause the antenna beam to focus in different directions as a function of range.

25 Claims, 4 Drawing Sheets

METHOD AND APPARATUS FOR A FREQUENCY DIVERSE ARRAY

CROSS-REFERENCE TO RELATED APPLICATIONS

The present application is a divisional application of and claims priority from related, and commonly assigned U.S. patent application Ser. No. 11/312,805 filed on Dec. 20, 2005, now U.S. Pat. No. 7,319,427 entitled "Method and Apparatus for a Frequency Diverse Array" also by Michael C. Wicks and Paul Antonik. Accordingly, U.S. patent application Ser. No. 11/312,805 is herein incorporated by reference.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of electronically-scanned phased array antennas. More specifically, the present invention relates to electronic beamformers for such antennas.

Phased array antennas have been developed to provide electronic beam steering of radiated or received electromagnetic signals. In traditional phased arrays, the signal applied to all radiating elements is identical. An amplifier is often placed near the radiating element to provide gain and to provide amplitude control for weighting to control sidelobe levels. A phase shifter is placed near the radiating element for beam steering. It is well known in the art that a linear phase shift applied across the radiating elements will cause the mainbeam of the antenna pattern to scan in varying degrees of angle from the boresight or axis of the array.

Frequency scanned arrays achieve similar off-axis mainbeam steering by varying the frequency of the radiated signal as a function of time.

Adaptive nulling was developed to control interference in the sidelobes of the antenna pattern. In this application, a constraint is placed on the amplitude and phase of each element such that the amplitude of the antenna pattern is small in the direction of an interfering signal, thereby attenuating the level of the interfering signal in the sidelobes relative to the amplitude of the desired signal in the mainbeam.

Space-time adaptive processing was developed to provide additional control of signals upon reception, downstream of the antenna.

Synthetic aperture radar was developed to produce long virtual apertures, thereby producing long dwell times and fine resolution of ground objects. In SAR, a small physical aperture is translated in space by the motion of the host platform. As the physical aperture is moved, the signals transmitted and received by the aperture are phase-shifted and added to produce a resultant sum that is similar to that of a larger physical aperture with many elements or subarrays. The virtual aperture is N times larger than the physical aperture, where N is the number of signals integrated, and results in a corresponding improvement in spatial resolution on the ground.

A limitation of the prior art is that, for any instant of time, beam steering is fixed in angle for all ranges. In the current state of the relevant art, multiple antennas or a multiple-beam antenna is required to direct radiated energy to different directions at various ranges.

In some applications, antenna patterns which focus in different directions with range would be very desirable. Such a mechanism would provide more flexible beam scan options, such as multiple transmit beams without spoiling the transmit pattern. Range dependent beamforming would also reduce interference arriving from fixed directions such as multipath.

OBJECTS AND SUMMARY OF THE INVENTION

The present invention provides a range dependent beamformer. Different signals are applied to each radiating element. Input signals are controlled such that the combined signal focuses in different directions depending on range. The present invention provides beam focusing and beam pointing that vary with range by providing for the control of adaptive transmit signals resulting in multiple transmit beams without spoiling, and simultaneous use of radiated energy for multiple conflicting requirements.

It is therefore an object of the present invention to provide an apparatus that overcomes the prior art's limitation of fixed beam scan for a given range.

It is a further object of the present invention to provide reduction of interference from sources located at fixed angles, such as multipath.

It is still a further object of the present invention to provide an apparatus wherein spotlight and strip map synthetic aperture radar can be performed simultaneously through common equipment.

It is yet still a further object of the present invention to provide an apparatus wherein signals of multiple classes can be radiated and utilized at the same time, such as synthetic aperture radar signals simultaneously with ground moving target indication signals, or communications signals simultaneously with radar signals.

An additional object of the present invention is to overcome a fundamental limitation of conventional synthetic aperture radar, wherein a small aperture is required for long dwell and fine cross-range resolution.

An additional object of the present invention is to also simultaneously provide multiple transmit beams without spoiling.

Briefly stated, the present invention achieves these and other objects through independent control of signals applied to radiating elements. Independently generated radio frequency signals are applied to each radiating element. Signal generation by means of multiple independent waveform sources is under the control of a waveform control subsystem. The waveform control subsystem adjusts the frequency, phase, polarization, and amplitude of all input signals. Input signals are selected to achieve range dependent beamforming.

A progressive frequency shift is applied to all radio frequency signals across all spatial channels. Amplitude weighting signals are applied for sidelobe control. Phase control is included for channel compensation and to provide nominal beam steering. The progressive frequency offsets generate a new term which cause the antenna beam to focus in different directions as a function of range.

A plurality of waveform generators produces a plurality of independent radio frequency signals, each being input to a respective spatial channel of a transmit/receive module. The input radio frequency signals each possess a relative frequency shift under the direction of a waveform control subsystem. The nominal frequency shift of each channel varies linearly with position in the array, and the frequency shifts of all elements or spatial channels are applied simultaneously.

The frequency-shifted signals are then amplified for gain and to apply amplitude weighting for sidelobe control. The signals are also phase shifted for nominal steering of the radiation pattern.

According to the present invention, method and apparatus for a frequency diverse array to provide range dependent beamforming comprises a plurality of independent radio frequency signal sources, a bank of amplifiers, a bank of phase shifters, an array of radiating elements, and a waveform control subsystem.

Application of a linear frequency shift across the aperture results in an antenna radiation pattern that varies with range. A greater or lesser degree of variation can be achieved by increasing or decreasing the amount of frequency shift between spatial channels. By varying the applied frequency shift with time, the antenna beam pattern can be made to scan a volume as directed by the waveform control subsystem.

In contrast to prior art devices, the present invention produces an antenna radiation pattern that varies with range. Nothing in the prior art teaches or suggests this feature of the present invention.

Therefore, it is accurate to say that the present invention (1.) can produce an antenna radiation pattern that varies with range; and (2.) can therefore mitigate the effects of interference from fixed angular positions such as multipath. As such, the present invention represents a significant improvement over prior art methods and apparatus.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
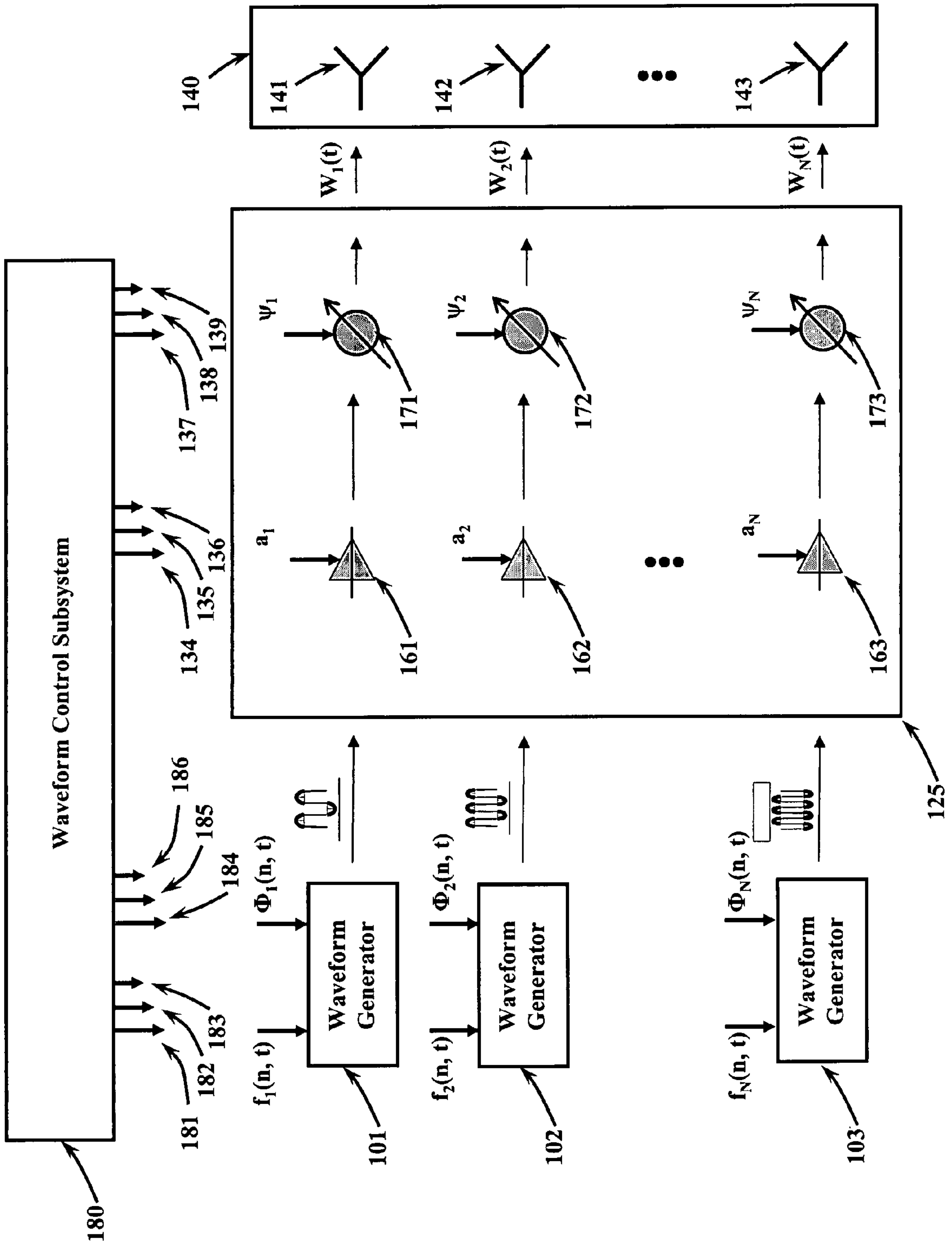
FIG. 1 is a schematic diagram representation of the present invention which provides independent control over synthesis of transmitted signals.

Referring to FIG. 1, depicts how the present invention provides enhanced control over the synthesis of transmitted signals. A plurality of waveform generators 101, 102 through 103 output radio frequency signals which are provided to a transmit/receive module 125. The outputs of the transmit/receive module 125 are provided to a like plurality of antenna radiating/receiving elements 141, 142 through 143. A waveform control subsystem 180 provides frequency modulation control signals 181, 182, 183 and phase modulation control signals 184, 185, 186 to the waveform generators 101, 102 through 103. The frequency and phase modulation control signals provide pulse-to-pulse and element-to-element frequency and phase diversity to the waveform generators as a function of time. The waveform control subsystem 180 also provides amplitude control signals 134, 135, 136 for power control and antenna weighting, and first phase control signals 137, 138, 139 for nominal beam steering. The frequency modulation control signals 181, 182, 183 and the second phase (modulation) control signals 184, 185, 186 permit the radiation of multiple signal modes at the same time.

The first through the nth waveform generators 101, 102 and 103 independently synthesize signals to be transmitted. These signals are ultimately distributed to each of the first and second through the nth radiating/receiving elements 141, 142, 143. The signals are applied to each input of a transmitter/receiver module 125 consisting of a set of first and second through an nth radio frequency amplifier 161, 162, 163 and a first and second through an nth phase shifter 171, 172, 173. The transmitter/receiver module 125 is controlled by a waveform control subsystem 180, which sends a plurality of control signals for each of amplitude 134, 135, 136, and phase 137, 138, 139. The outputs of the transmitter/receiver module 125 are provided to an antenna array 140 consisting of radiating/receiving elements 141, 142, 143, which may, in turn, be subarrays of radiating/receiving elements.

Still referring to FIG. 1, a plurality of spatial channels is depicted. The actual number of transmitter/receiver module 125 signal outputs $W_1(t) \ldots W_N(t)$ depends upon the number of antenna elements 141, 142, and 143. It follows that the number of amplifiers 161, 162 and 163, and phase shifters 171, 172 and 173 will be identical to the number of waveform generators 101, 102 and 103.

Still referring to FIG. 1, the waveform control subsystem 180 provides a plurality of amplitude modulation control signals 134, 135, 136 and phase modulation control signals 137, 138, 139 to each respective amplitude and phase modulation section of the transmit/receive module 125. The amplitude modulation control signal 134, 135, 136 permits power control as well as a mechanism to apply amplitude weighting for antenna sidelobe control. The phase modulation control signal 137, 138, 139 introduces a radiating/receive element-to-radiating/receive element phase shift for conventional or nominal beam steering, which is independent of the range-dependent beam steering afforded by the frequency modulation control provided by each frequency modulation control signal 181, 182, 183. Frequency modulation control signals provides a frequency shift which increases linearly across radiating/receive elements at any point in time.

If all of the signal output waveforms $W_1(t) \ldots W_N(t)$ being radiated or received from the radiating/receiving elements 141, 142 and 143, are identical with identical phase, the antenna beam will point at broadside, or orthogonal to the face of the antenna aperture. Now consider a far field target at an angle θ with respect to broadside direction. If all of the waveforms are identical continuous wave signals, then the only difference between the returns from adjacent radiating elements 141 and 142 is due to path length difference:

$$R_1 - R_2 = d\sin(\theta),$$

where d is the spacing between any two adjacent elements 141 and 142.

The path length difference results in a phase shift from element 141 to element 142:

$$\psi = 2\pi d/\lambda \sin(\theta)$$

An incremental phase shift ψ from element-to-element (linear phase progression across the aperture) will steer the antenna mainbeam to angle θ.

Next, allowing the frequency of the waveform radiated/received from each element to increase by a small amount, Δf, from element-to-element, then for element 141, the one-way electrical path length in wavelengths is:

$$l_1=R_1/\lambda_1=R_1 f_1/c.$$

For element 142, the electrical path length becomes:

$$\begin{aligned} l_2 &= R_2/\lambda_2 \\ &= R_2 f_2/c \\ &= \{R_1 - d\sin(\theta)\} f_2/c \\ &= \{R_1 - d\sin(\theta)\}\{f_1 + \Delta f\}/c \\ &= R_1 f_1/c - d\sin(\theta) f_1/c + R_1\Delta f/c - d\sin(\theta)\Delta f/c. \end{aligned}$$

The electrical path length difference between element 141 and element 142, in radians, is then:

$$\psi=-2\pi d\sin(\theta)f_1/c+2\pi R_1\Delta f/-2\pi d\sin(\theta)\Delta f/c,$$

provided that $\Delta f$ is negligible in computing the path length difference.

The new terms due to frequency diversity are $2\pi R_1\Delta f/c$ and $-2\pi d\sin(\theta)\Delta f/c$. The first term is range and frequency offset dependent, while the second term is dependent on the scan angle and frequency offset. The first new term shows that for a frequency diverse array in the present invention the apparent scan angle of the antenna now depends on range.

In a frequency diverse array a frequency shift is applied across elements rather than solely as a function of time.

Figure 2:
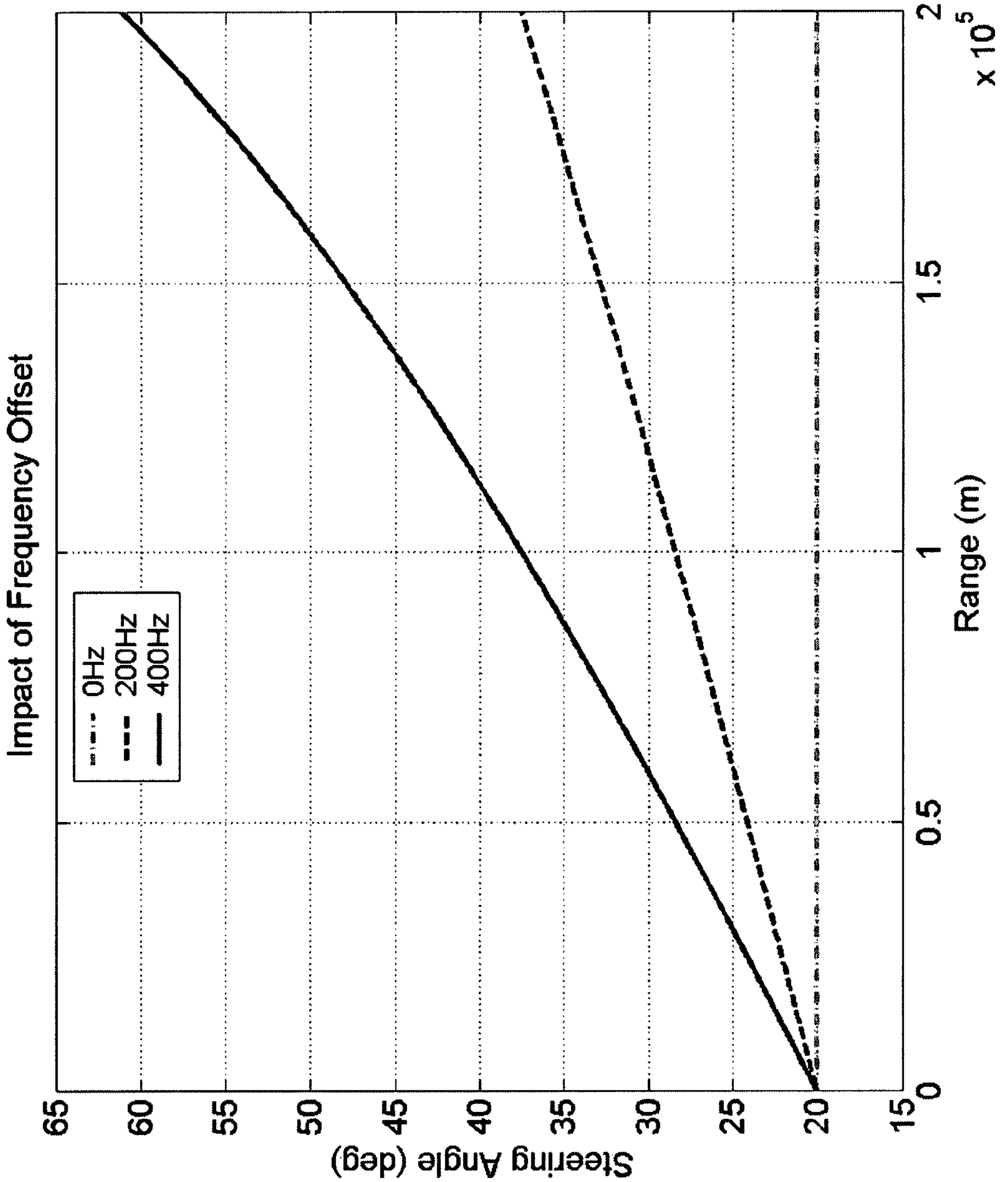
FIG. 2 is a graphical representation of beam scan (steering angle) versus range in meters for an antenna array operating at 10 Giga Hertz (GHz) for frequency shifts (offsets) of 0 Hz, 200 Hz, and 400 Hz.

Referring now to FIG. 2, the effect of range-dependent beamforming for a frequency diverse array is depicted. Scan angle is plotted as a function of range for various frequency offsets at a nominal steering direction of 20 degrees. The most significant beam bending is achieved for larger frequency offsets. The frequency offset, $\Delta f$, must be less than the reciprocal of a receiver's coherent observation interval in order to make the individual waveforms inseparable.

Figure 3:
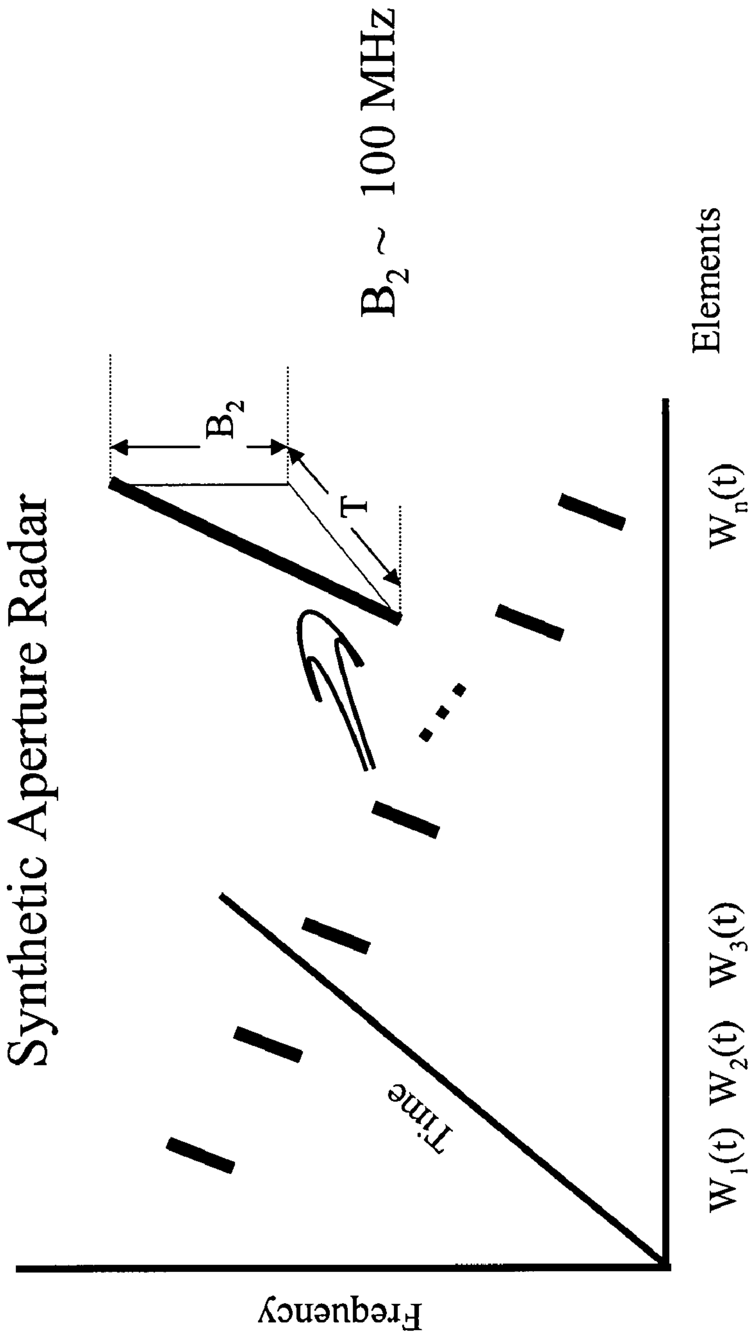
FIG. 3 is a graphical representation of the present invention configured to achieve spotlight and strip map synthetic aperture radar simultaneously.

Referring to FIG. 3 a space-time illumination wherein the waveform generators 101, 102, 103 (see FIG. 1) output a plurality of linear frequency modulation signals to the transmit/receive module is depicted. A channel-to-channel frequency offset is also applied, as in the preferred embodiment. Different linear frequency modulation signals are applied to each antenna element 141, 142, 143 (see FIG. 1), to permit spotlight synthetic aperture radar and stripmap synthetic aperture radar modes at the same time. By processing all received signals in combination as well as separately, the described illumination permits a large aperture on transmit for high gain while enabling a plurality of spotlight synthetic aperture radars to operate simultaneously. The invention therefore defeats a fundamental limitation of conventional synthetic aperture radar, wherein a small aperture is required for long dwell and fine cross-range resolution.

Figure 4:
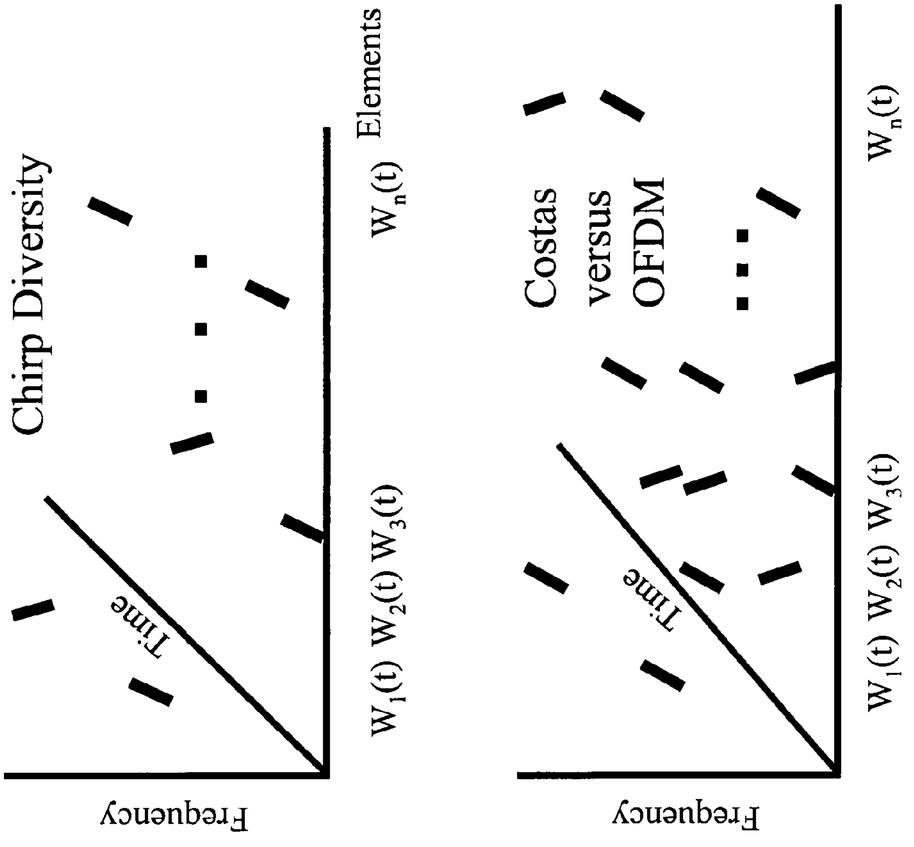
FIG. 4 is a graphical representation of the present invention configured to achieve synthetic aperture radar and ground moving target indication simultaneously.

Referring to FIG. 4 a space-time illumination to achieve synthetic aperture radar and ground moving target indication at the same time is depicted. In the prior art, synthetic aperture radar and ground moving target indication are fundamentally different processes. Synthetic aperture radar is an integration process which requires on the order of hundreds of megahertz of bandwidth to achieve sufficient range resolution for imaging. Ground moving target indication is a differencing process that requires only several megahertz of bandwidth for detection. The present invention permits modes to be constructed to support synthetic aperture radar and ground moving target indication at the same time by providing chirp diversity and phase modulation across the transmit/receive elements 141, 142 through 143, and processing all elements in combination and individually.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for electronically forming an antenna beam pattern, comprising:

a plurality of waveform generators each producing as an output an independent radio frequency (RF) signal;

wherein each of said plurality of waveform generators being independently controllable in frequency and phase;

a transmit/receive module having a plurality of inputs and outputs and having a channel disposed between each of said plurality of corresponding inputs and outputs;

wherein each of said plurality of inputs being connected correspondingly to the output of each of said plurality of waveform generators, and wherein said transmit/receive module further comprises means for:

modulating the amplitude and phase characteristics of at least one of said plurality of RF signals;

modulating any of said characteristics independently of any of said other characteristics; and modulating any of said characteristics of any of said plurality of RF signals independently of any of other said plurality of RF signals;

a waveform control subsystem having means for applying signals to:

said plurality of waveform generators so as to control frequency and phase of said output RF signal; and to said transmit/receive module so as to control said means for modulating said amplitude and phase characteristics; and at least one RF radiating/receiving element being connected to at least one of said transmit/receive module outputs.

2. Said channel of claim 1, further comprising means for RF signal amplification and phase shifting.

3. Waveform control subsystem of claim 1, wherein said means for applying signals to said waveform generators further comprises:

a frequency modulation control channel; and a first phase modulation control channel corresponding to each of said waveform generators; and wherein said means for applying signals to said transmit/receive module further comprises:

an amplitude modulation control signal channel; and a second phase modulation control signal channel corresponding to each of said disposed channels of said transmit/receive module.

4. Means for applying signals of claim 3, further comprising a frequency characteristic that:

is independently scalable in frequency; and that increases for each successive said waveform generator, from a minimum frequency value in the first said waveform generator and to a maximum frequency value in the Nth said waveform generator for each of said frequency modulation control signal channels.

5. Frequency characteristic of claim 4, wherein said frequency characteristic varies linearly with time.

6. Frequency characteristic of claim 4, wherein said frequency characteristic varies non-linearly with time.

7. Means for applying signals of claim 3, further comprising:

an independently scalable amplitude characteristic for each of said amplitude modulation control signal channels.

8. Means for applying signals of claim 3, further comprising:

an independently scalable phase characteristic for each of said first phase modulation control signal channels; and said second phase modulation control signal channels.

9. Means for applying signals of claim 8, wherein said phase characteristic of said first and said second phase modulation control signal channels that varies linearly with time.

10. Means for applying signals of claim 8, wherein said phase characteristic of said first and said second phase modulation control signal channels that varies non-linearly with time.

11. Means for applying signals of claim 8, wherein said phase characteristic of said first and said second phase modulation control signal channels that varies from pulse-to-pulse with time.

12. Said channel of claim 2, wherein the input of said means for amplifying is connected to said input of said channel;

the output of said means for amplifying is connected to the input of said means for phase shifting; and the output of said means for phase shifting is connected to said output of said channel.

13. Frequency characteristic of claim 4, wherein said frequency characteristic varies from pulse-to-pulse with time.

14. Apparatus of claim 1, wherein an electrical path length (range) difference to adjacent said RF radiating/receiving elements in radians, ψ, is represented by:

$$\psi=-2\pi d\sin(\theta)f_1/c+2\pi R_1\Delta f/-2\pi d\sin(\theta)\Delta f/c$$

where θ represents a steered angle of a mainbeam;

Δf represents an element-to-element waveform frequency difference;

$R_1$ represents a one-way range path length from said radiating elements; and

D represents an element-to-element spacing.

15. Method for electronically forming an antenna beam pattern, comprising:

generating a plurality of independent radio frequency (RF) signals;

wherein said step of generating further comprises the step of independently controlling the frequency characteristics and the first phase characteristics of each of said plurality of independent RF signals;

channelizing each of said plurality of RF signals into a like plurality of channels, wherein each of said plurality of channels is disposed between a corresponding input and output;

modulating the amplitude and the second phase characteristics of at least one of said plurality of channels, said step of modulating further comprising the steps of modulating any of said characteristics independently of any of said other characteristics; and modulating any of said characteristics of any of said plurality of channels independently of any of other said plurality of channels; and radiating into free space at least one of said plurality of channelized RF signals through at least one RF radiating/receiving element being connected to at least one of said outputs of said plurality of channels.

16. Step of modulating of claim 15, further comprising a first step of applying control signals so as to effectuate said step of independently controlling the frequency characteristics and the first phase characteristics of each of said plurality of independent RF signals; and a second step of applying control signals so as to effectuate said step of modulating the amplitude and the second phase characteristics of at least one of said plurality of channels.

17. Said first step of applying control signals of claim 16, further comprising the steps of:

scaling frequency independently; and scaling frequency from a minimum frequency value in the first said RF signal and to a maximum frequency value in the Nth said RF signal of each of said RF signals.

18. Step of scaling frequency of claim 17, wherein said scaling induces a frequency variance selected from the group consisting of linearly and non-linear variance, with time.

19. Said second step of applying control signals of claim 16, further comprising:

independently scaling the amplitude of each of said plurality of channels.

20. Said first and said second steps of applying control signals of claim 16, further comprising:

independently scaling said first phase of each of said RF signals; and independently scaling said second phase of each of said plurality of channels, respectively.

21. Said steps of scaling of claim 20, wherein said first phase of each of said RF signals and said second phase of each of said plurality of channels are induced with a variance characteristic selected from the group consisting of: linearly variance with time; non-linear variance with time; and pulse-to-pulse variance.

22. Said first step and said second step of applying control signals of claim 16, both further comprising the step of applying said control signals with particularity so as to permit simultaneous stripmap and spotlight synthetic aperture radar functionality through a common aperture of RF radiating/receiving elements.

23. Said first step and said second step of applying control signals of claim 16, both further comprising the step of applying said control signals with particularity so as to permit simultaneous ground moving target indication and spotlight synthetic aperture radar functionality through a common aperture of RF radiating/receiving elements.

24. Said first step and said second step of applying control signals of claim 16, both further comprising the step of applying said control signals with particularity so as to permit simultaneous communications and radar functionality through a common aperture of RF radiating/receiving elements.

25. Said first step and said second step of applying control signals of claim 16, both further comprising the step of applying said control signals with particularity so as to provide adaptive processing by generating a steering vector; wherein said step of generating a steering vector further comprises the step of introducing frequency offsets so as to form beams dependent upon range; and said step of introducing frequency offsets includes Doppler offsets.

* * * * *